United States Patent [19]

Buss

[11] 3,888,210
[45] June 10, 1975

[54] FISH HUSBANDRY SYSTEM UTILIZING AT LEAST PARTIAL RECIRCULATION OF WATER

[75] Inventor: Keen W. Buss, Boalsburg, Pa.

[73] Assignee: Marine Protein Corporation, Londonderry, Rockingham, N.H.

[22] Filed: Feb. 28, 1974

[21] Appl. No.: 446,970

Related U.S. Application Data

[63] Continuation-in-part of Ser. No. 228,016, Feb. 22, 1972, abandoned.

[52] U.S. Cl. .................................................. 119/3
[51] Int. Cl. ............................................ A01k 63/00
[58] Field of Search .................................... 119/3, 5

[56] References Cited
UNITED STATES PATENTS
2,944,513  7/1960  Keely .................................. 119/3
3,760,767  9/1973  Hickey ................................ 119/3

Primary Examiner—Hugh R. Chamblee

[57] ABSTRACT

A fish husbandry system for the intensive rearing of fish for human consumption in a controlled environment having a fish rearing vertically extending tank wherein the water flows in substantially laminar fashion from bottom to top, oxygen saturation is maintained by introducing water into the tank through a downwardly divergent hood means, the lower end of which is in fluid communication with the water in the bottom portion of the tank. The hood means comprises two concentric hoods, the inner one delivering fresh water to the tank and the outer one delivering recirculated water to the tank. Overflow water from the tank is degasified, passed through an annular filter, into a sump disposed centrally in said annular filter and then is pumped into the top of the hood means for delivery to the outer hood.

10 Claims, 5 Drawing Figures

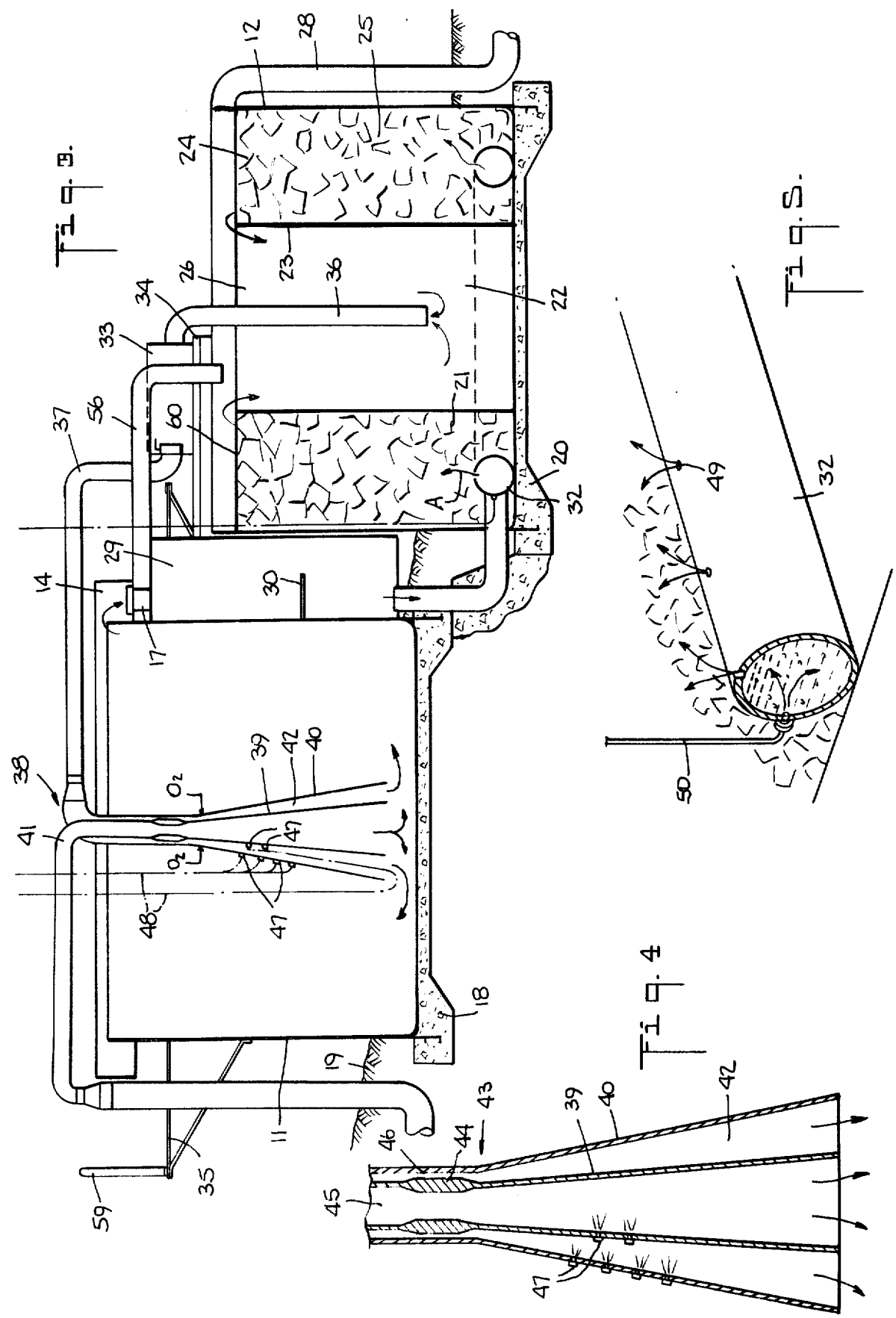

3,888,210

FISH HUSBANDRY SYSTEM UTILIZING AT LEAST PARTIAL RECIRCULATION OF WATER

RELATED APPLICATIONS

This application is a continuation-in-part of application Ser. No. 228,016, filed Feb. 22, 1972, now abandoned.

BACKGROUND OF THE INVENTION

There has been considerable work done recently on the intensive raising of fish on a large scale for human consumption in order to provide sources of protein food that have a high output per acre of facility. Pond culture has been known and utilized since ancient times and up until now has predominated in the large-scale raising of fish. Recent efforts, however, have indicated that greater productivity and efficiency may be achieved by utilization of systems developed by the inventor.

The inventor has developed into commercial reality a system which in certain embodiments utilizes silos, either alone or in series of tanks, in which fish densities of about 6 lbs. of fish per cubic foot and up to about 50 lbs. of fish per gallon of water per minute are achieved. It has been discovered by the inventor that maintaining the oxygen level in the water at about saturation and maintaining an upward laminar flow of water of about at least 1 foot per minute not only provides the fish with the required oxygen demand but also carries waste material upwardly and out of the tank and maintains the tanks in a self-cleansing condition.

The foregoing fish husbandry system is described in U.S. applications Ser. No. 16,830, filed Mar. 5, 1970 (now abandoned), Ser. No. 162,190, filed July 15, 1971 (now abandoned) and Ser. No. 432,306, filed Jan. 10, 1974.

The above described vertical units on a large scale are advantageous particularly in areas where large volumes of fresh water are available for a once-through operation, and several commercial installations are presently operating on that basis.

In order to make the above system available in areas either where there are more limited water supplies or where smaller installations are desired an effective and economically practical filtration system has been desired, and, as will be seen below in describing the present invention, such a filtration system has now been developed permitting substantially complete reuse of water.

SUMMARY OF THE INVENTION

A fish husbandry system for the intensive raising of fish in an artificial, controlled environment has been developed involving reuse of water. The system involves an improved and novel double concentric oxygenation hood means in the fish rearing tank which introduces fresh makeup water through the inner hood and reconditioned water through the outer hood. The fish rearing tank is a vertically-extending cylindrical tank in which the water flows from bottom to top in a substantially laminar fashion at an upward velocity of at least about 1 foot per minute. The overflow from the periphery at the top of the tank is passed through a degasifier to remove nitrogen, then is passed into the bottom of a filtration tank having an annular stone-filled filter compartment through which it passes upwardly and then overflows into a central filtrate compartment or sump from whence it is pumped to the inlet of the outer hood in the rearing tank.

By the above described method and apparatus, a water reuse system for the intensive raising of fish has been achieved without requiring more complex denitrification procedures, thereby providing an improved water reuse system of significant economy and greater efficiency in comparison with prior art methods.

BRIEF DESCRIPTION OF THE DRAWINGS

A fish husbandry system utilizing recirculation of water, constructed in accordance with the preferred embodiment of the invention, is illustrated in the accompanying drawings in which:

FIG. 3 is an elevation and partial section of the system shown in FIGS. 1 and 2;

FIG. 4 is an enlarged fragmentary view in vertical section of the hood means in the rearing tank; and FIG. 5 is an enlarged fragmentary isometric view of a portion of the filter bed inlet pipe.

DETAILED DESCRIPTION OF THE PREFERRED EMBODIMENT

Figure 1:
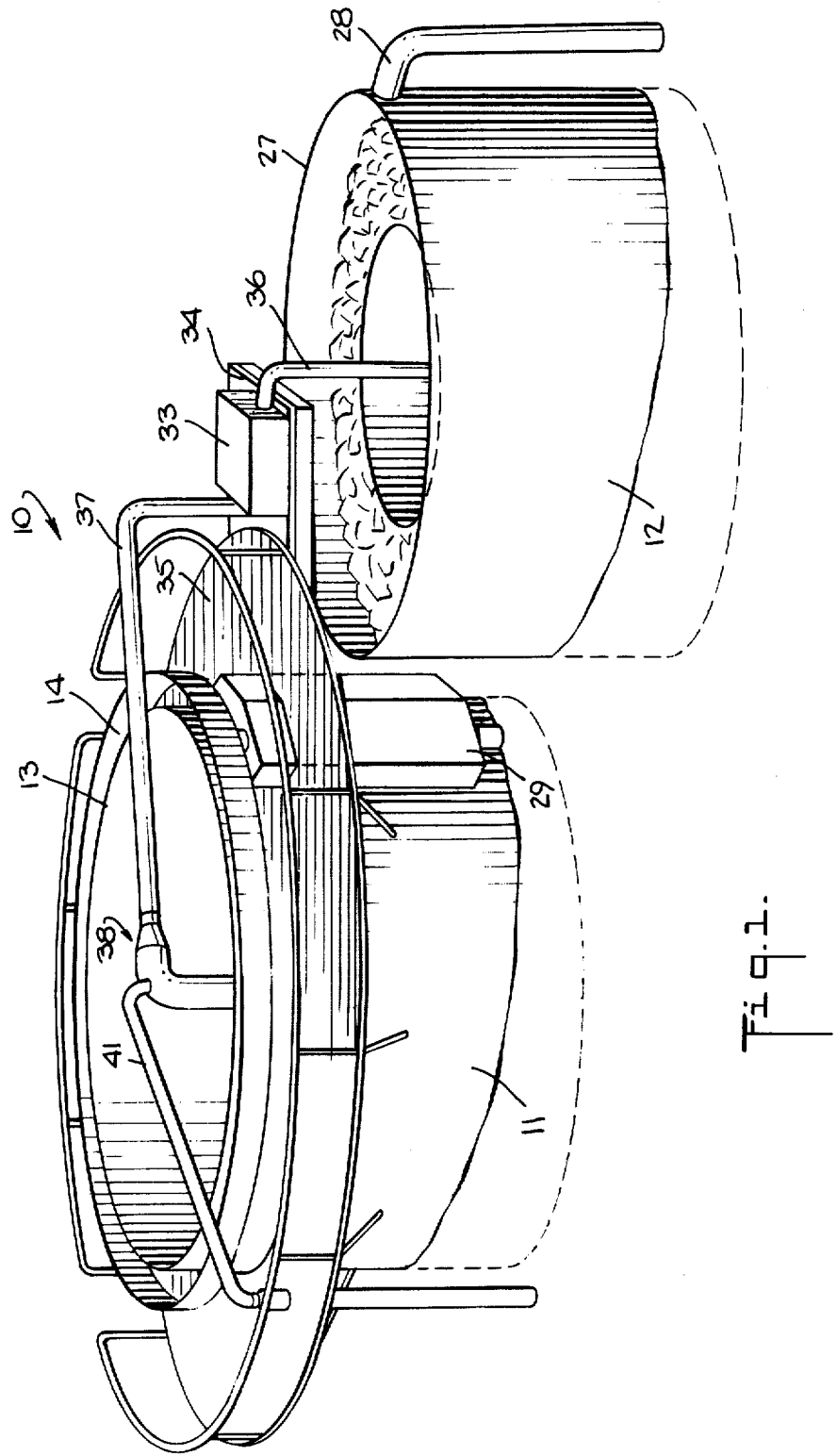
FIG. 1 is an isometric view of the overall system showing the rearing tank, the filtration tank, and interrelated piping.

Referring to FIG. 1, an intensive fish rearing system is shown and designated generally by reference numeral 10. The system comprises a fish rearing tank 11 and a water reconditioning tank 12 (see also FIGS. 2 and 3). The fish rearing tank 11 is a vertically extending cylindrical tank as shown which may be fabricated from any suitable conventional material such as fiber glass, steel or the like and may have a height to diameter ratio in excess of 1/1, although in an already constructed installation has a diameter of 17 ft. 2 in. and a height of 13 ft. 6 in. Around the upper periphery 13 of rearing tank 11 is overflow trough 14 which receives the exit water overflowing at the top of the tank and delivers it by gravity flow through one of three exit means 15, 16, 17, respectively, as will be described hereinafter (see FIG. 2).

Rearing tank 11 is fixedly mounted on a concrete base 18 or the like at substantially ground level 19, as shown in FIG. 3. Adjacent tank 11 is reconditioning tank 12 which is similarly mounted on concrete base 20 located below the level of tank 11 to provide a sufficient gravity head between the two tanks so that the overflow from tank 11 will pass through the filter compartment 21 and into filtrate compartment 22 without requiring additional energy to be supplied to the system.

Reconditioning tank 12 is a cylindrical tank of suitable dimensions, e.g. 12 ft. 4 in. high and 17 ft. 2 in. in diameter, having a centrally disposed inner cylindrical partition 23 defining an annular compartment 24 containing filter media such as 4 inches limestone rock 25 and filtrate compartment 26. Partition 23 terminates at a height below that of outer wall 27 of the reconditioning tank 12 (e.g. about 12 inches).

At the top portion of outer wall 27 is an overflow or exit pipe 28 for discharging water directly from the top of reconditioning tank 12 to the drain (not shown).

Adjacent rearing tank 11 and disposed between the latter and reconditioning tank 12 is degasifying chamber 29 interconnectable through drain member 17 with overflow trough 14 (see FIGS. 2 and 3) to receive the overflow or exit water from tank 11 which falls downwardly as viewed in FIG. 3, impinges on laterally extending plate 30 disposed therein, and causes the removal of entrapped or dissolved carbon dioxide and nitrogen gas from the water and then delivers it to bottom conduit 31 communicating with octagonal conduit 32 disposed at the bottom of the filter compartment in reconditioning tank 12. Pump means 33 is disposed on platform 34 overlying reconditioning tank 12 and extending from catwalk 35 disposed around the upper portion of rearing tank 11. Inlet pipe 36 of pump 33 extends down into filtrate compartment 22. Pump discharge conduit 37 interconnects with hood means 38 as shown particularly in FIG. 3.

Centrally disposed in rearing tank 11 is oxygenation hood means 38 comprised of two concentrically disposed downwardly divergent hoods 39, 40. Inner hood 39 is connected at its upper end with fresh water conduit 41 and outer hood 40 is interconnected with recycle conduit 37 as shown. In this arrangement fresh water is delivered to rearing tank 11 through the interior of hood 39, and recirculated and reconditioned water is delivered to rearing tank 11 through the interstitial compartment 42 defined by hoods 39 and 40. At the throat portion 43 of hood means 38 the inner hood 39 has an enlarged gland area 44 providing constricted passages 45, 46 for increasing the turbulence of the incoming fresh and recirculated water, respectively to enhance mixing thereof with the oxygen, and to provide sufficient pressure (e.g. 10 psig) to prevent gaseous-oxygen from escaping upwardly from the hoods against the flow of incoming water. The hoods function generally as described in U.S. Pat. No. 3,643,403 to Speece dated Feb. 22, 1972.

Each hood member 39, 40 may contain relief valve members or ports (not shown) to vent the interior of each hood adjacent its throat portion in the event of excessive large bubble formation within the hood that would prevent or interfere with the downward flow of incoming water (see also FIG. 4). Such relief ports would be suitably vented to the atmosphere. Gaseous oxygen is supplied to each hood through inlet ports 47, being interconnected by supply lines 48 with a suitable oxygen source.

As shown in FIG. 5, conduit 32 has a plurality of exit holes 49 preferably in its upper surface for delivering water upwardly into filter bed 25, as shown by arrow A in FIG. 3. Compressed air line 50 is interconnected with conduit 32 for selective delivery of air to conduit 32 during the backwash operation described below. Alternatively, the compressed air may be delivered to a separate conduit (not shown) which may be either disposed internally or externally of conduit 32 but generally coextensive therewith around the bottom of the filter compartment 21.

Figure 2:
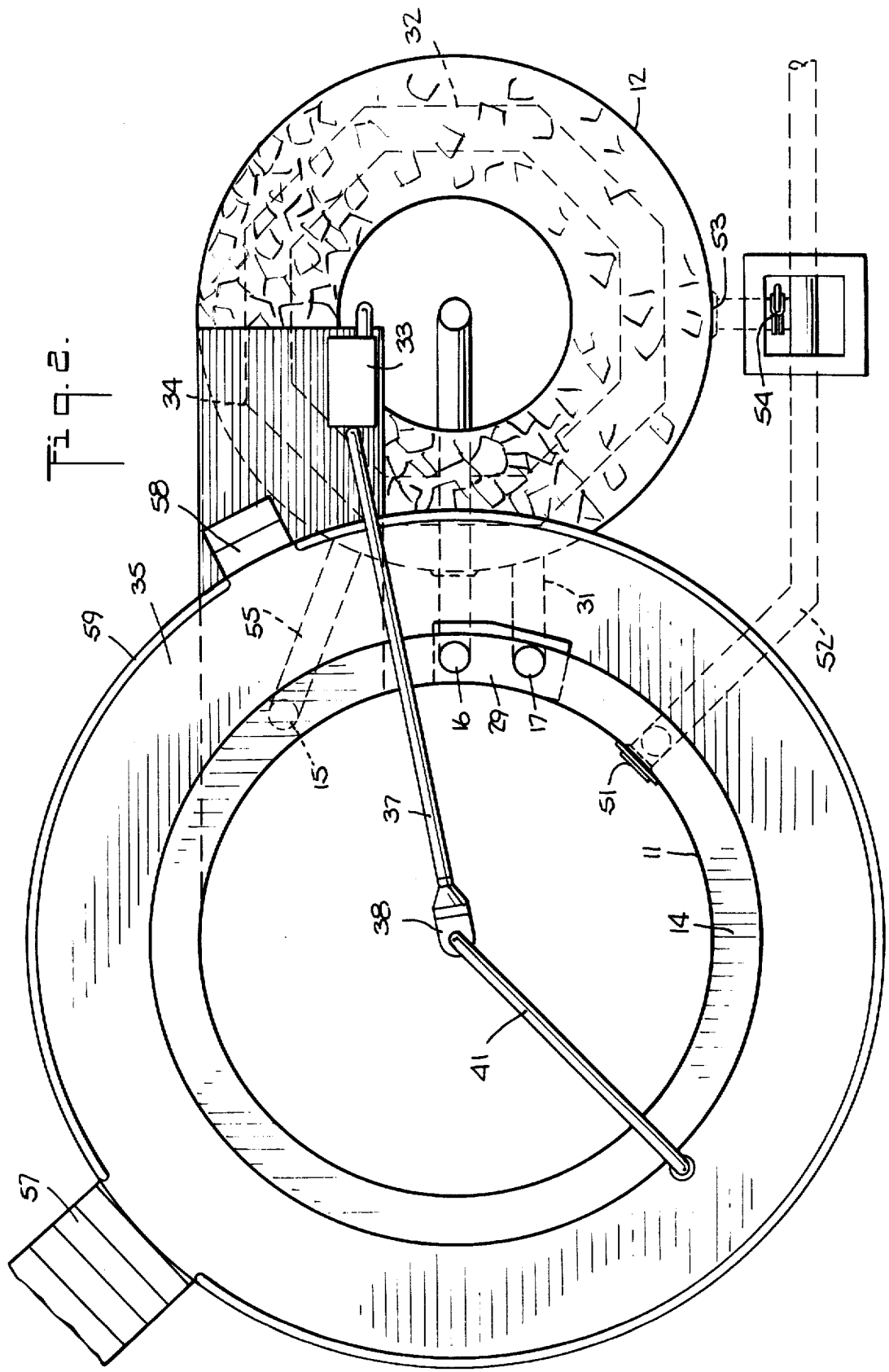
FIG. 2 is a plan view of the system of FIG. 1.

Rearing tank 11 is provided with bottom drain valve 51 (e.g. shear gate or the like) interconnecting with drain pipe 52 which discharges to a settling pond, sewer or the like. Likewise reconditioning tank 12 has bottom drain connection 53 interconnectable by valve 54 with drain 52. Drain 53 directly connects with the bottom of filter compartment 21 as shown in FIG. 2. Outlet 15 in overflow trough 14 interconnects through conduit 55 (FIG. 2) with drain 52 or otherwise interconnects with the settling pond, sewer, etc. Outlet 16 in overflow trough 14 communicates through conduit 56 with the top of filtrate compartment 22 as shown in FIG. 3.

Outlets 15, 16 and 17 in overflow trough 14 are closed, when not in use, by any suitable means such as standpipes (not shown) and are manually operable.

Suitable access to platform 35 is provided by ladder or steps 57. Access between catwalk 35 and platform 34 is provided similarly by steps 58 and guard rail 59 is provided around catwalk or platform 35 for safety of the operator.

In use, tank 11 is filled with water and contains about 23,000 gallons in the tank described above. The tank holds approximately 20,000 lbs. of fish which may be from fingerling size upward, amounting to about 6 to 7 lbs. of fish per cubic foot of water. Fresh water is supplied through conduit 41 from any suitable source, for example at 300 gallons per minute. Recycled water is supplied through conduit 37, for example at 1,500 gallons per minute. Oxygen in the rearing tank 11 is maintained at about 9 to 10 parts per million, at the above water rate amounting to about 50 lbs. of oxygen per day per tank. The average temperature of the water is 50° Fahrenheit. The fish in the tank under the above conditions are preferably trout, although various types of fish may be raised under the same or similar conditions such as trout, salmon, carp, etc.

The pressure developed at the throats 45, 46 in the hoods should be about 6 to 10 lbs. per square inch to provide the desired turbulence in the incoming water streams to mix the gaseous oxygen with the water. The water rate is sufficient to provide approximately 10 seconds retention time of water and oxygen in the hoods before discharge thereof into the tank at the bottom.

At an upward velocity of about 1 foot per minute, the water pases upwardly in tank 11, out through overflow trough 14 and normally through outlet 17, through the degasification chamber 29 where nitrogen is removed, through exit pipe 31, into octagonal distributing conduit 32 and upwardly through filter media 21 in the reconditioning tank 12. Such filter media remove solid matter such as fecal matter and the like. The water then overflows from the top 60 of the filter compartment 21 and into filtrate compartment 22 from which it is drawn through conduit 36 by pump 33 and returned to the hood means 38 through conduit 37. This is the normal recirculation system employed in raising fish to full grown size.

It has been found that no other degasing procedures are required with this system, although, if desired, conventional degasing methods may be employed. Chemical treatment such as the addition of formalin for disease prevention may be employed occasionally, e.g. once a month. Approximately every 24 hours a backwash cycle is employed for approximately 20 minutes. In such backwash cycle outlet 16 is opened in overflow trough 14 delivering water through conduit 56 to filtrate compartment 22. Outlets 15 and 17 in overflow trough 14 are closed. Water passes from filtrate tank 22 over the top thereof and down through filter media in filter compartment 21 and out through drain 53, through open valve 54 to drain 52. Optionally, compressed air may be introduced through line 50 to increase the turbulence in the filter compartment 21 to assist in dislodging any entrained solid material during the backwash cycle.

In the above system it has been found that fish may be reared intensively while reusing water and requiring only makeup water. In the system described approximately 84 % of the water is recycled, although such percentage may even be higher if desired. With the above system, a bacteriological filter has not been required, nor has it been found necessary to either heat to or remove heat from the water being used, although provision for such features is optional. As shown, there has been developed a technically and economically feasible recirculation system which substantially has minimized the demands placed on a water source and has enhanced the development of improved fish culture techniques. With such a workable recirculation system it is possible to survive periods of drought with only minimal supplies of water to replace evaporation, leakage and other avoidable losses. It is also readily apparent that the present system enables relatively large-scale production of edible fish in areas of the world where only limited supplies of fresh water are available.

I claim:

1. Apparatus for intensive rearing of fish in a controlled environment for human consumption utilizing reuse of the water comprising at least one vertically extending fish rearing tank adapted for bottom to top relatively uniform substantially laminar upward water flow having an exit water overflow trough around its upper portion, means associated therewith including a reconditioning tank having an outer wall, an inner filtrate compartment, and an interstitial filter compartment defined by said filtrate compartment and said outer wall and containing filtration media therein, said filter compartment having respective inlet and exit means, first water conduit means interconnecting said overflow trough with said inlet means, said exit means communicating with said filtrate compartment, second water conduit means interconnecting said filtrate compartment with said rearing tank, pump means associated with said second water conduit means for pumping reconditioned water from said filtrate compartment to said rearing tank, oxygenation hood means disposed in said rearing tank having an upper inlet means and a lower exit means disposed adjacent the bottom interior portion of said tank, fresh water conduit means and said second water conduit means connected to said hood inlet means and degasification chamber means interposed in said first water conduit means for removing gaseous contaminants from said exit water.

2. In the apparatus of claim 1 said oxygenation hood means including a downwardly divergent inner hood member interconnected at its upper inlet end with said fresh water conduit means and a similarly shaped outer coaxial hood member disposed outwardly from said inner hood member to define an interstitial fluid passageway therebetween, said passageway communicating at the upper end of said outer hood member with said reused water conduit means, each said hood member having an internal constriction near its upper end adapted to increase the turbulence of water passing therethrough, and oxygen supply means interconnected with each hood member below its said constriction to supply gaseous oxygen to the water passing through said hood member for dissolution therein.

3. In the apparatus of claim 2, relief valve means on each said hood member below its respective constriction to vent excessive gas pressure from within said hood to the atmosphere.

4. In the apparatus of claim 2, said filter compartment including an annular distributor conduit means in the bottom thereof connected to said first water conduit means for delivering water from said degasification chamber substantially uniformly to said filter media.

5. In the apparatus of claim 4, compressed air supply means interconnected with said distributor conduit means for delivering air under pressure to said filter compartment.

6. In the apparatus of claim 2, third conduit means connecting said overflow trough with the top of said filtrate compartment, drain valve means in the bottom of said reconditioning tank for draining said filter compartment, and valve means in said third conduit means actuatable with said drain valve means for a backwash cycle for said filter compartment.

7. In the apparatus of claim 2, the liquid handling capacity of said reconditioning tank relative to that of the fish rearing tank being sufficient for at least 85% water reuse in said apparatus.

8. In the apparatus of claim 4, said filtration media comprised of about 4 inches limestone rock.

9. In the apparatus of claim 8, said oxygenation means capable of maintaining about 10 ppm dissolved oxygen in the water in said fish rearing tank.

10. The method of intensively raising edible fish for human consumption comprising providing a vertically extending water-filled space containing fish at a density of up to about 7 pounds per cubic foot of water, flowing the water from bottom to top in said space at a rate of at least about one foot per minute in a substantially laminar fashion, and at a flow rate of up to 50 pounds of fish per gallon per minute flow of water, introducing fresh and reconditioned water streams into the bottom of said space having an oxygen concentration of about 10 ppm and in a ratio of at least about 85 parts reconditioned water to 15 parts fresh water, oxygenating said water streams separately within separate segregated downwardly flared coaxial streams within said space by establishing initial areas of turbulence in each said coaxial stream at an upstream point, separately injecting oxygen into each said area of turbulence, then gradually reducing the downward velocity of each said coaxial stream to provide a residence time of at least about ten seconds prior to desegregation thereof at the bottom of said space, discharging used water at the top of said space, degasifying said used water to remove substantially all carbon dioxide and nitrogen therefrom, filtering the degasified water to remove solid material therefrom, and introducing the filtered water back into said space.

* * * * *